United States Patent
Park et al.

(10) Patent No.: US 8,335,518 B2
(45) Date of Patent: Dec. 18, 2012

(54) METHOD FOR PERFORMING LOCATION UPDATE OF MOBILE STATION IN IDLE MODE

(75) Inventors: Gi Won Park, Anyang-Si (KR); Yong Ho Kim, Anyang-Si (KR); Ki Seon Ryu, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 12/538,472

(22) Filed: Aug. 10, 2009

(65) Prior Publication Data

US 2010/0035633 A1 Feb. 11, 2010

Related U.S. Application Data

(60) Provisional application No. 61/087,728, filed on Aug. 10, 2008.

(30) Foreign Application Priority Data

Aug. 20, 2008 (KR) .......... 10-2008-0081595
Sep. 8, 2008 (KR) .......... 10-2008-0088481
Jan. 15, 2009 (KR) .......... 10-2009-0003435
Feb. 23, 2009 (KR) .......... 10-2009-0014899

(51) Int. Cl.
*H04W 24/00* (2009.01)

(52) U.S. Cl. ............... 455/456.1; 455/174.1; 455/194.1; 455/574; 455/127.5; 455/13.4; 455/522; 455/456.2; 455/456.3; 455/456.4; 455/456.5; 455/456.6

(58) Field of Classification Search ....... 455/456.1–457, 455/432.1, 435.1, 435.2, 435.3, 440, 442
See application file for complete search history.

(56) References Cited

U.S. PATENT DOCUMENTS

| 6,363,255 B1 * | 3/2002 | Kuwahara ............... 455/456.5 |
| 2002/0072369 A1 | 6/2002 | Sasada et al. |
| 2005/0250474 A1 * | 11/2005 | Hong et al. ............... 455/411 |
| 2006/0025134 A1 | 2/2006 | Cho et al. |
| 2006/0062175 A1 * | 3/2006 | Ling et al. ............... 370/328 |
| 2008/0095088 A1 | 4/2008 | Ryu et al. |
| 2008/0102789 A1 | 5/2008 | Sung |

FOREIGN PATENT DOCUMENTS

| JP | 2002-165255 A | 6/2002 |
| JP | 2008-60853 A | 12/2007 |
| KR | 10-2001-0059552 A | 7/2001 |
| WO | 2006/138326 A1 | 12/2006 |
| WO | 2007/126596 A1 | 11/2007 |
| WO | 200/139353 A1 | 12/2007 |

OTHER PUBLICATIONS

Tao et al., "Location-Based Paging Mechanism in 16m," IEEE 802. 16 Broadband Wireless Access Working Group, IEEE C802.16m-08/ 579, pp. 1-5, Jul. 7, 2008.

* cited by examiner

*Primary Examiner* — Olumide T Ajibade Akonai
*Assistant Examiner* — Edward Zhang
(74) *Attorney, Agent, or Firm* — Birch, Stewart, Kolasch & Birch, LLP

(57) ABSTRACT

A method for performing location update in various manners when a mobile station (MS) travels between paging groups in a wireless access system. A method for performing location update of an MS includes steps of transmitting a ranging request message (REG-REQ) including mobility information to a base station, wherein the mobility information represent a mobility of the mobile station; and receiving a ranging response message (RNG-RSP) including paging group information related with new paging group from the base station, wherein the new paging group is assigned based on the mobility information.

18 Claims, 12 Drawing Sheets

METHOD FOR PERFORMING LOCATION UPDATE OF MOBILE STATION IN IDLE MODE

CROSS-REFERENCE TO RELATED APPLICATIONS

This application claims the benefit of the Korean Patent Application Nos. 10-2008-0081595, filed on Aug. 20, 2008, 10-2008-0088481, filed on Sep. 8, 2008, 10-2009-0003435, filed on Jan. 15, 2009, and filed on Feb. 23, 2009 which are hereby incorporated by reference as if fully set forth herein.

This application also claims the benefit of U.S. Provisional Application Ser. No. 61/087,728, filed on Aug. 10, 2008 the content of which is hereby incorporated by reference herein in their entirety.

BACKGROUND OF THE INVENTION

1. Field of the Invention

The present invention relates to a method for performing location update in various manners when a mobile station travels between paging groups in a wireless access system.

2. Discussion of the Related Art

Hereinbelow, a paging group and an idle mode of a mobile station (MS), which are associated with embodiments of the present invention, will be described in brief.

FIG. 1 illustrates an example of paging groups each consisting of a plurality of base stations (BSs).

Paging refers to a function for discerning the location (e.g., any BS or any switching station) of a corresponding MS, upon occurrence of an incoming signal in mobile communication. As illustrated in FIG. 1, a plurality of BSs supporting an idle mode may belong to a paging group to construct a paging area.

At this time, the paging group indicates a logical group. The paging group provides an adjacent range area which can be paged through a downlink when traffic targeting an MS is present. It is desirable that the paging group be large enough to accommodate specific MSs within the same paging group during most of the time and be sufficiently small to maintain a paging load at a proper level.

FIG. 1 shows 4 paging groups defined in multiple BSs located on hexagonal lattices. One BS may be contained in one or more paging groups. The paging group is defined in a management system. The paging group may use paging group action backbone network messages. A paging controller may manage a list of an idle-mode MS using a paging-announce message which is one of the backbone network messages and may manage initial paging of all BSs belonging to the paging group.

An idle mode refers to an operation which supports periodic transmission of downlink broadcast traffic of a BS without being registered in a specific BS when the MS travels in a wireless link environment comprised of multiple BSs.

The idle mode may be of benefit to an MS by eliminating activation requests related to handover and general operation requirements. The idle mode limits activation of the MS to be scanned during a discrete period, thereby reducing power consumption and operation resources used by the MS.

Furthermore, the idle mode may provide a simple and proper method which is capable of informing the MS of pending downlink traffic and may be helpful to a network and a BS by eliminating a wireless interface and network handover traffic from an inactive MS.

SUMMARY OF THE INVENTION

An object of the present invention devised to solve the problem lies in providing an efficient communication method.

Another object of the present invention devised to solve the problem lies in providing a method for performing efficient location update when an idle-mode MS travels between paging groups.

A further object of the present invention devised to solve the problem lies in providing a method for introducing a hierarchical paging group and performing efficient paging between paging group layers or within each paging group layer.

Another object of the present invention devised to solve the problem lies in providing a method for changing a paging group from a small paging group to a large paging group or from a large paging group to a small paging group by dividing the paging group into the large paging group and the small paging group and a method for changing the paging group from a specific large paging group to another large paging group.

The object of the present invention can be achieved by providing a method for performing location update when an MS travels between paging groups in a wireless access system.

In an aspect of the present invention, provided herein is a method for performing location update of an MS in an idle mode, including receiving a message which includes first paging information including paging group timer information and predefined broadcast channel cycle information, checking one or more first broadcast channels according to the predefined broadcast channel cycle information during an interval of a paging group timer, and changing a paging group when a count value included in the one or more first broadcast channels does not exceed a prescribed threshold.

The change of the paging group may further include transmitting a paging request message to perform location update, and receiving a paging response message including second paging information.

The paging group timer may be a large paging group timer, the count value may be a small paging group change count, the prescribed threshold may be a small paging group change threshold, and the paging request message may include a small paging group identifier (ID) for changing a paging group from a large paging group to a small paging group.

The first broadcast channels may include a primary broadcast channel to which information used commonly in a network is assigned, and a secondary broadcast channel to which information used in a specific cell or a small paging group is assigned.

The small paging group change count may be assigned to the secondary broadcast channel. The predefined broadcast channel cycle information may indicate a periodic fixed cycle. The large paging group timer may be reset if the large paging group timer has expired. The check of the first broadcast channels may be omitted and the change of the paging group is performed, if the large paging group timer has expired.

The first paging information may further include a large paging group ID indicating that the MS is changed from a small paging group to a large paging group, and the second paging information may include a small paging group ID assigned to the MS.

The method may further include measuring a traveling speed when the MS is in a normal mode, and determining a paging group to which the MS is to be assigned according to the traveling speed, wherein the first paging information further includes a large paging group ID indicating that a paging group initially assigned to the MS is a large paging group.

The method may further include receiving a second broadcast channel including a prescribed parameter for determining a paging group type which is to be assigned when the MS in a normal mode enters an idle mode, determining the paging group type using the prescribed parameter, and transmitting a message including the determined paging group type. The prescribed parameter may include at least one of an MS speed threshold parameter, a maximum handover count parameter, a call or packet arrival rate threshold parameter, and a maximum preferred BS count parameter. The prescribed parameter may be included in the first broadcast channels as well. Then the MS can efficiently change a paging group type even in an idle mode.

The paging group timer may be a small paging group timer, the count value may be a small paging group change count value, and the paging request message may include a second small paging group ID for changing a paging group from a first small paging group to a second small paging group.

In another aspect of the present invention, provided herein is a method for performing location update of an MS in an idle mode, including transmitting a message which includes first paging information including large paging group timer information and predefined broadcast channel cycle information, periodically transmitting a broadcast channel including a small ranging group change count value, and performing location update with the MS to change a paging group of the MS, when the small ranging group change count value does not exceed a small ranging group change threshold. The broadcast channel may further include the small ranging group change threshold.

The performing the location update may further includes receiving a paging request message from the MS, and transmitting a paging response message including second paging information.

In still another aspect of the present invention, A method for performing location update of a mobile station (MS) in an idle mode, the method comprising: transmitting a ranging request message (REG-REQ) including mobility information to a base station, wherein the mobility information represent a mobility of the mobile station; and receiving a ranging response message (RNG-RSP) including paging group information related with new paging group from the base station, wherein the new paging group is assigned based on the mobility information.

The mobility indicates a speed of the mobile station as one of slow, medium, and fast.

The method further comprises steps of transmitting a deregistration request (DREG-REQ) message to initiate the idled mode, to the base station and receiving a deregistration command (DREG-CMD) message allowing an initiation of the idle mode.

The mobile station is assigned to one or more paging group. In this case, a paging group of the one or more paging group is primary paging group and rest of the one or more paging group is secondary paging group.

The primary paging group is a large paging group and the secondary paging group is a small paging group, or the primary paging group is a small paging group and the secondary paging group is a large paging group.

In the present invention, a size of the primary paging group and a size of the secondary paging group are different each other.

In addition, the base station is belonged to one or more paging groups.

In further another aspect of the present invention, a method for supporting a location update of a mobile station (MS) in an idle mode, the method comprising: receiving a ranging request message (REG-REQ) including mobility information from the mobile station, wherein the mobility information represent a mobility of the mobile station; and transmitting a ranging response message (RNG-RSP) including paging group information related with new paging group to the mobile station, wherein the new paging group is assigned based on the mobility information.

In this case, the mobility indicates a speed of the mobile station as one of slow, medium, and fast.

The method further comprises receiving a deregistration request (DREG-REQ) message to initiate the idled mode, from the mobile station; and transmitting a deregistration command (DREG-CMD) message allowing an initiation of the idle mode, to the mobile station.

Where the further another aspect of the mobile station is assigned to one or more paging group.

A paging group of the one or more paging group is primary paging group and rest of the one or more paging group is secondary paging group.

In this case, the primary paging group is a large paging group and the secondary paging group is a small paging group, or the primary paging group is a small paging group and the secondary paging group is a large paging group.

In addition, a size of the primary paging group and a size of the secondary paging group are different each other.

The base station may be belonged to one or more paging groups.

In still another aspect of the present invention, a mobile station for performing location update in an idle mode, the mobile station comprising: means for transmitting a ranging request message (REG-REQ) including mobility information to a base station, wherein the mobility information represent a mobility of the mobile station; and means for receiving a ranging response message (RNG-RSP) including paging group information related with new paging group from the base station, wherein the new paging group is assigned based on the mobility information.

In still another aspect of the present invention, a base station (BS) for supporting a location update of a mobile station (MS) in an idle mode, the base station comprising: means for receiving a ranging request message (REG-REQ) including mobility information from the mobile station, wherein the mobility information represent a mobility of the mobile station; and means for transmitting a ranging response message (RNG-RSP) including paging group information related with new paging group to the mobile station, wherein the new paging group is assigned based on the mobility information.

According to the embodiments of the present invention, the following effects are obtained.

First, efficient communication can be performed.

Second, when an idle-mode MS changes a paging group, location update can be efficiently performed.

Third, paging message overhead and broadcast paging message overhead can be reduced using a hierarchical paging group structure.

Fourth, unnecessary signaling overhead can be reduced by providing a method for changing a paging group from a large paging group to a small paging group.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
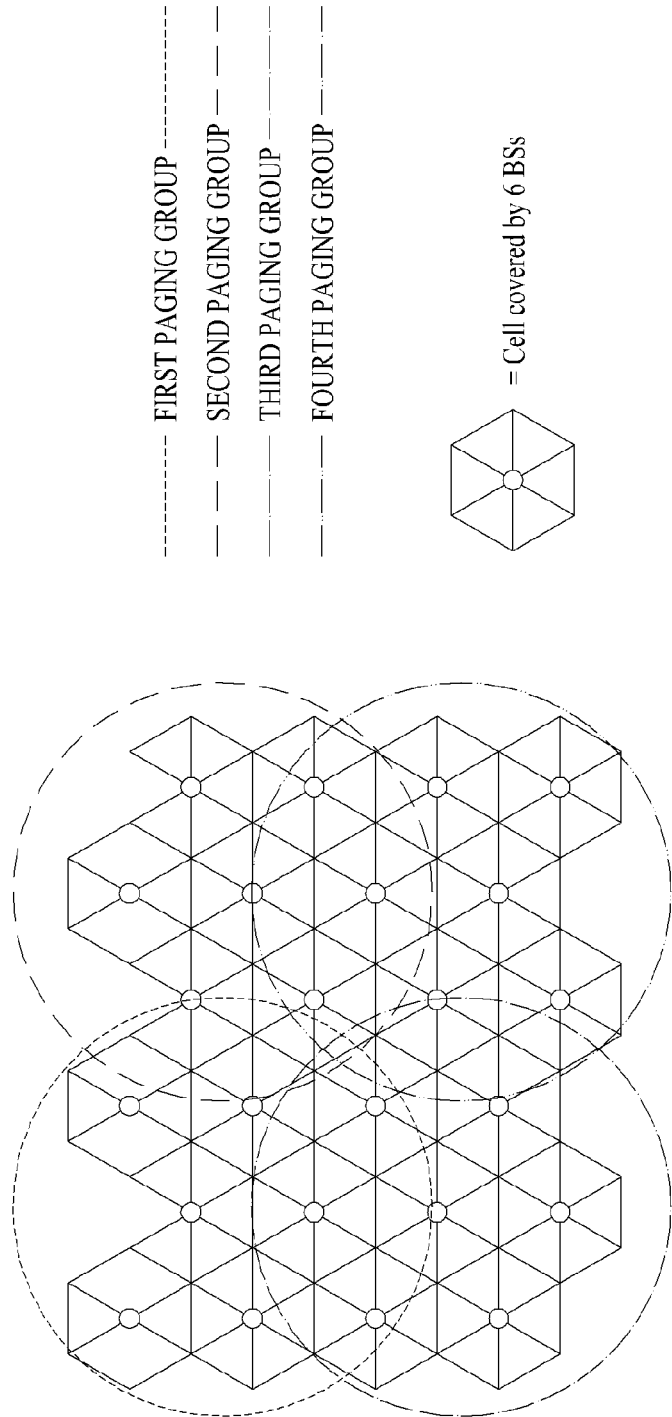
FIG. 1 illustrates an example of paging groups each consisting of a plurality of BSs.

Hereinafter, preferred embodiments of the present invention will be described in detail with reference to the annexed drawings. The detailed description, which will be given below with reference to the accompanying drawings, is intended to explain exemplary embodiments of the present invention, rather than to show the only embodiments that can be implemented according to the invention.

Reference will now be made in detail to the exemplary embodiments of the present invention, examples of which are illustrated in the accompanying drawings.

The exemplary embodiments of the present invention provide various methods of performing location update when an MS travels between paging groups.

The exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment.

In a description of the drawings, procedures or steps which may obscure the subject matter of the present invention will not be described and procedures or steps which can be understood by those skilled in the art will also be omitted.

In the exemplary embodiments of the present invention, a description is made of a data transmission and reception relationship between a base station (BS) and a mobile station (MS). Here, the term 'BS' refers to a terminal node of a network communicating directly with the MS. In some cases, a specific operation described as performed by the BS may be performed by an upper node of the BS.

Namely, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'advanced base station (ABS)', 'access point', etc. The term 'MS' may be replaced with the term 'user equipment (UE)', 'subscriber station (SS)', 'mobile subscriber station (MSS)', 'advanced mobile station (AMS)', 'mobile terminal', etc.

A transmitting end refers to a node which transmits a data or voice service and a receiving end refers to a node which receives a data or voice service. Therefore, in uplink, an MS may correspond to the transmitting end and a BS may correspond to the receiving end. Similarly, in downlink, the MS may correspond to the receiving end and the BS may correspond to the transmitting end.

An MS employed in the present invention may be a personal digital assistant (PDA), a cellular phone, a personal communication service (PCS) phone, a global system for mobile (GSM) phone, a wideband code division multiple access (wide CDMA) phone, a mobile broadband system (MBS) phone, etc.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The embodiments of the present invention can be supported by standard documents disclosed in at least one of the IEEE 802 system, the 3GPP system, the 3GPP LTE system, and the 3GPP2 system which are radio access systems. That is, steps or portions that are not described in the embodiments of the present invention for the sake of clearly describing the spirit of the present invention may be supported by the above documents. For all terms used in this disclosure, reference can be made to the above standard documents. Especially, the embodiments of the present invention may be supported by P802.16e-2005 or P802.16Rev2 which is a standards document of the IEEE 802.16 system.

The specific terms described in the following description are provided to aid the understanding of the present invention and those terms may be changed to other forms without departing from the spirit of the present invention.

Figure 2:
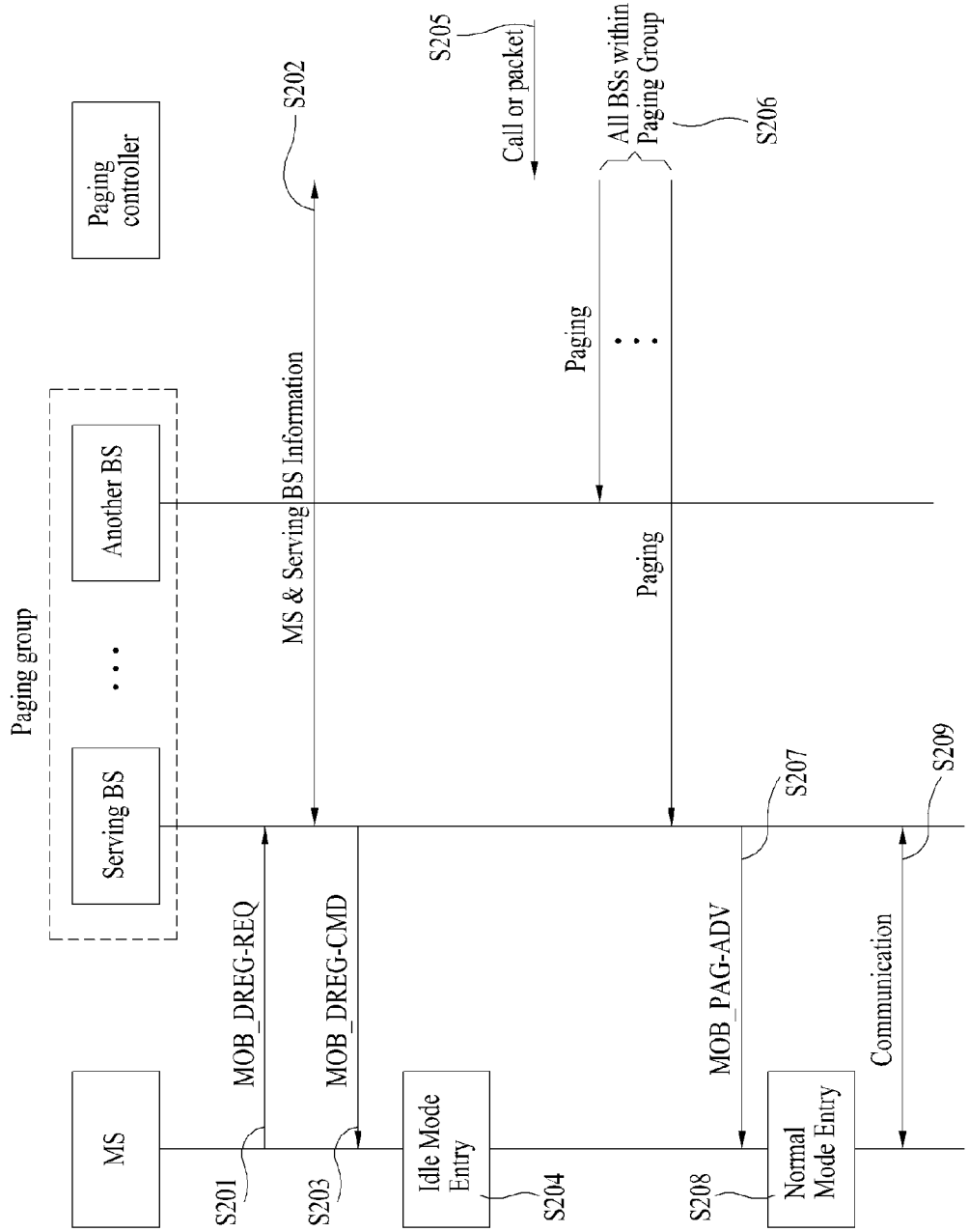
FIG. 2 is a diagram illustrating a paging procedure in an IEEE 802.16 system which one type of wireless access system.

FIG. 2 is a diagram illustrating a paging procedure in an IEEE 802.16 system which is one type of wireless access system.

Paging in an idle mode may be performed in units of paging groups. For example, an MS may belong to one or multiple paging groups. A paging controller of each paging group performs paging for searching for an MS, when a call, or a user packet transmitted to the MS from an external network is received. The paging may be performed such that the paging controller transmits a paging message to all BSs within the paging group and each BS receiving the paging message broadcasts a paging advertisement (MOB_PAG-ADV) message to the MS.

Referring to FIG. 2, an MS transmits a deregistration request (MOB_DREG-REQ) message to a serving BS to enter an idle mode from a normal mode (step S201).

The serving BS receiving the MOB_DREG-REQ message may transmit/receive information about the MS and the serving BS to/from a paging controller. Namely, the serving BS may inform the paging controller of an identifier (ID) of the MS entering the idle mode and an ID of the serving BS. Further, the paging controller may inform the serving BS of a paging group ID or an ID thereof. The paging group ID or the paging controller ID may be used to transmit and receive the paging message (step S202).

The serving BS may transmit a deregistration command (MOB_DREG-CMD) message as a response to the MOB_DREG-REQ message to the MS. The MOB_DREG-CMD message may include paging information, such as a paging cycle, paging offset, and a paging listening interval. The MOB_DREG-CMD message may further include the paging controller ID and the paging group ID (step S203).

The MS confirming the MOB_DREG-CMD message enters the idle mode. The MS may receive the paging message based on the paging information received through the MOB_DREG-CMD message. That is, the MS may monitor a wireless channel as to whether a paging message transferred thereto is present during the paging listening interval. During a period of time other than the paging listening interval, the MS operates in a sleep mode to reduce power consumption (step S204).

A call or external packet may be transmitted to the paging controller (step S205).

Upon reception of the call or external packet, the paging controller may perform a paging procedure. The paging controller transmits a paging message to all BSs within a paging group (step S206).

The BSs within the paging group, receiving the paging message, broadcast the MOB_PAG-ADV message to MSs managed by them (step S207).

The MS confirms the MOB_PAG-ADV message. If the paging controller has paged the MS, the MS may enter a normal mode to communicate with the serving BS (steps S208 and S209).

Hereinafter, a location update procedure which may be used in the exemplary embodiments of the present invention will be described in detail.

An MS, which is in an idle mode state, may perform location update according to various initialization conditions. First, the MS may perform location update when a paging group thereof is changed. Second, the MS may perform location update when a location update timer has expired. Furthermore, the MS may support power down update and medium access control (MAC) hash skip threshold update methods.

1. Hierarchical Paging Group Allocation Structure and Paging Group Allocation Method FIG. 3 is a diagram illustrating a geographical concept of a large paging group and a small paging group according to an exemplary embodiment of the present invention.

In the embodiments of the present invention, the base station (BS) may be a member of one or more paging groups that may have different paging cycle and paging offset. In addition, the mobile station (MS) may be assigned one or more paging groups.

Figure 3:
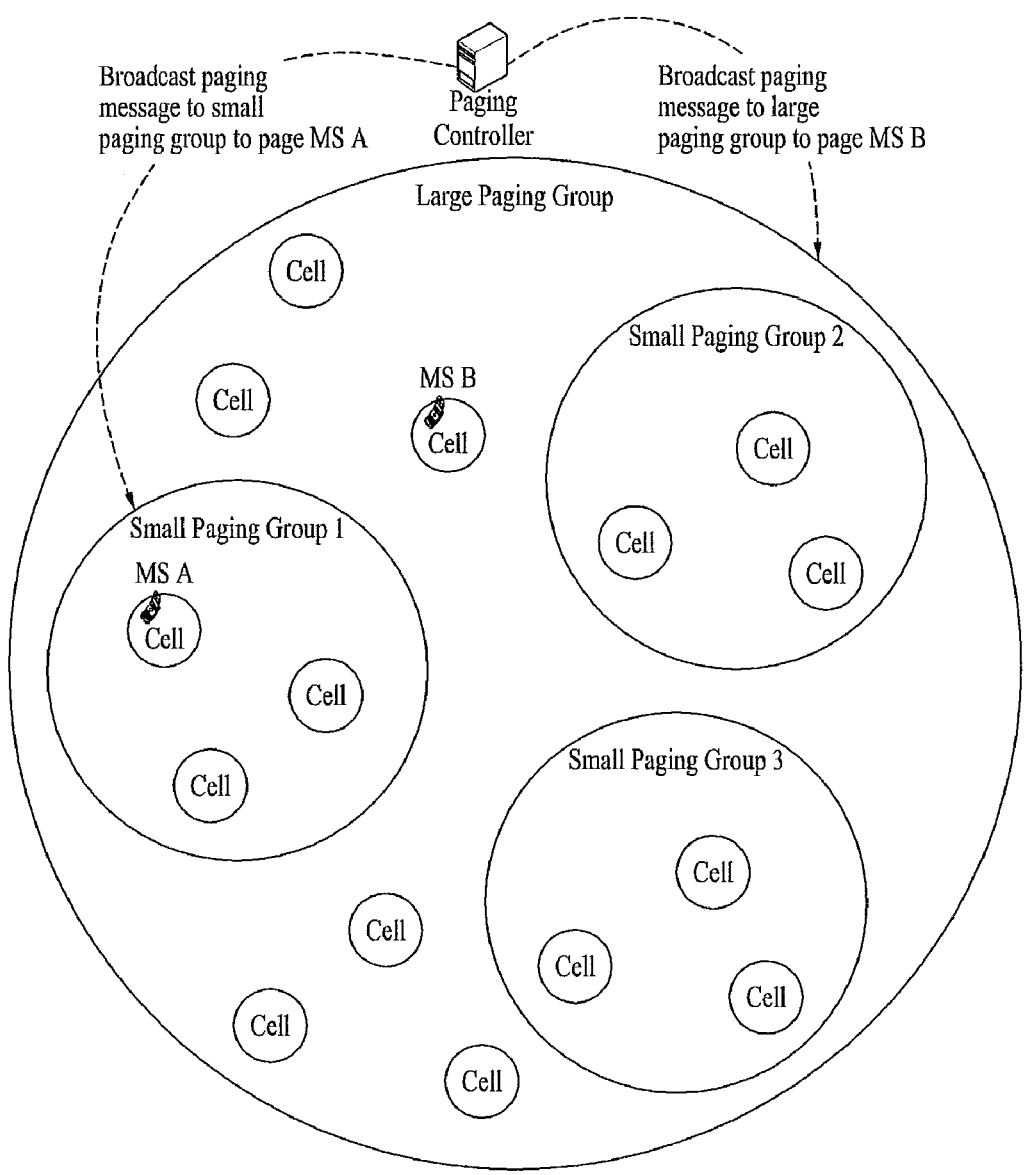
FIG. 3 is a diagram illustrating a geographical concept of a large paging group and a small paging group according to an exemplary embodiment of the present invention.

Referring to FIG. 3, a geographical location relationship between a large paging group (LPG) and a small paging group (SPG) is shown. The LPG may include one or more SPGs. One paging controller may be located in one LPG. One paging controller may also be used for one or more LPGs. When a call or packet destined for a specific MS occurs, the paging controller may transmit a paging message to an LPG or an SPG.

To page an MS 'A' belonging to a first SPG (SPG 1), the paging controller may broadcast a paging message only to the first SPG, as illustrated in FIG. 3. Moreover, to page an MS 'B' belonging to an LPG, the paging controller may broadcast a paging signal to the whole LPG area.

Thus, if the paging groups are hierarchically constructed as in the LPG and SPG, overhead of decoding a paging message can be reduced in terms of an MS. In addition, overhead of broadcasting the paging message can be reduced in terms of a network.

In the exemplary embodiments of the present invention, networks of various structures may be constructed.

First, a network may be constructed in which the whole network includes one or more LPGs and one LPG includes one or more SPGs (a network including a plurality of LPGs and a plurality of SPGs).

Second, the whole network and an LPG may be constructed to have the same size. That is, the whole network may be constructed by one LPG and one LPG may include one or more SPGs (a network including one LPG and a plurality of SPGs).

When the hierarchical paging group is used as illustrated in FIG. 3, the serving BS may assign an SPG or an LPG to an MS. Accordingly, the serving BS may assign an LPG ID and/or an SPG ID to the MS.

A method for allocating the LPG ID and SPG ID will now be described in the case where the whole network includes N LPGs in FIG. 3.

First, a user may use an SPG together with an LPG according to each LPG. Namely, the SPG ID is newly assigned with respect to each LPG, so the MS can discriminate the location thereof using the LPG ID and SPG ID. For example, one network may include LPG#1, LPG#2, . . . , and LPG#N, and the LPG#1 may include SPG#1, SPG#2, . . . , and SPG#M. The LPG#2 may include SPG#1, SPG#2, . . . , and SPG#L. In this way, the MS and BS are able to recognize the locations thereof using the LPG ID and SPG ID.

Second, a user may use an SPG independently of an LPG. That is, the SPG ID is independently assigned irrespectively of the LPG ID, so that the MS can discriminate the location thereof and the LPG using the SPG ID. For example, assuming that one network includes 3 LPGs and 20 SPGs, LPG#1 may include SPG#1, SPG#2, . . . , and SPG#5, LPG#2 may include SPG#6, SPG#7, . . . , SPG#14, and LPG#3 may include SPG#15, SPG#16, . . . , SPG#20.

In the second method, it is assumed that once paging group areas are fixed, they are not easily changed. The MSs and BSs may be aware of a local area to which each paging group belongs and may be aware of a paging area to which a specific MS belongs using an ID of each paging group. For instance, if an SPG ID assigned to an MS is SPG#9, then the MS can know that an LPG to which it belongs is LPG#2.

A serving BS, a paging controller, or an MS may determine a paging group to which the MS is to belong when the MS enters an idle mode.

A method for initially allocating a paging group to an MS is as follows.

First, the serving BS may initially assign a specific SPG to the MS without any restrictions when the MS enters an idle mode.

Second, the MS and serving BS may determine an initial paging group using history information of the MS. For instance, while the MS operates in a normal mode before entering the idle mode, the LPG may be assigned from the beginning when the traveling speed of the MS is fast and the SPG may be assigned from the beginning when the traveling speed of the MS is slow.

The exemplary embodiment of the present invention describes various methods of measuring the traveling speed of the MS in a normal mode.

For instance, the traveling speed of the MS may be measured using the number of handovers of the MS during a specific period of time and a change of Doppler frequency for the MS. The traveling speed of the MS at a current time point may be measured and an average speed of the MS during a predefined duration of time may also be obtained.

When the MS is assigned to more than one paging groups, one of the mobile station's paging groups is called primary paging group and rest of the assigned paging group is called secondary paging group. For instance, small paging group (SPG) can be used as primary paging group and large paging group (LPG) can be used as secondary paging group. Of course, if the LPG may be set to primary paging group, than then the SPG is set to secondary paging group.

When an MS is assigned to only one paging group, the paging group is considered as a primary paging group.

Figure 4:
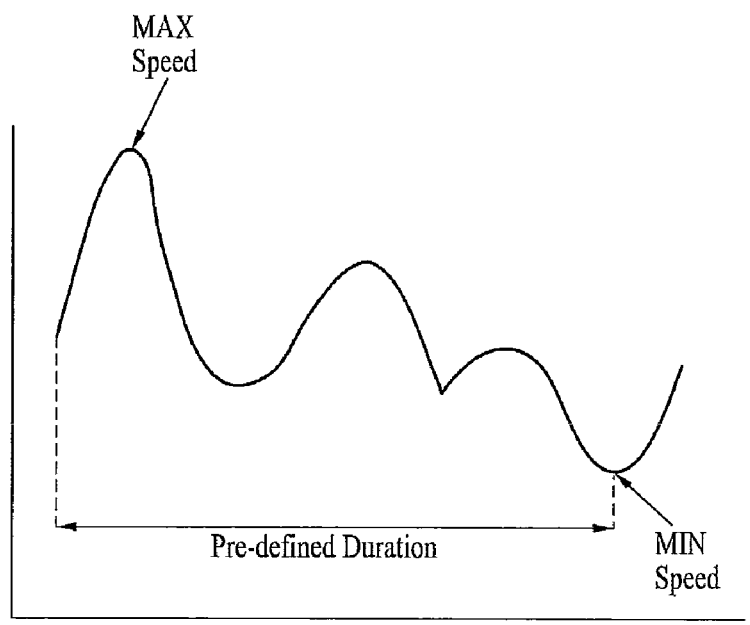
FIG. 4 illustrates an example of calculating an average speed of an MS using maximum and minimum speeds of the MS according to an exemplary embodiment of the present invention.

FIG. 4 illustrates an example of calculating an average speed of an MS using maximum and minimum speeds of the MS according to an exemplary embodiment of the present invention.

Referring to FIG. 4, an average speed of the MS may be calculated using a maximum speed value and a minimum speed value of the MS during a predefined duration.

The following Equation 1 indicates an example of calculating an average speed of the MS.

$$\frac{MAXSpeed + MINSpeed}{2} \quad \text{[Equation 1]}$$

Figure 5:
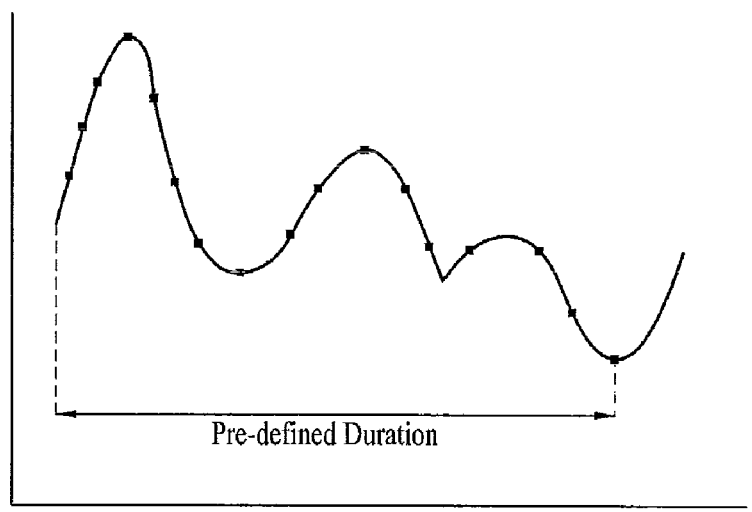
FIG. 5 illustrates an example of calculating an average speed using interval sampling according to an exemplary embodiment of the present invention.

FIG. 5 illustrates an example of calculating an average speed using interval sampling according to an exemplary embodiment of the present invention.

Referring to FIG. 5, an MS may determine a plurality of sampling intervals during a predefined duration. An average speed of the MS may be obtained by the following Equation 2 using the sum of speeds at respective sampling intervals.

$$\frac{S_1 + S_2 + S_3 + \ldots + S_n}{n} \quad \text{[Equation 2]}$$

where n denotes the number of sampling intervals.

The speed of the MS may be calculated by extending the method of FIG. 5. For example, when calculating a traveling speed of the MS, more weight is applied to a current time than to a previous time to obtain the speed of the MS more considering a recent speed. Alternatively, weighting may be applied to a specific time to further reflect the speed of the MS at a specific time.

The following Equation 3 indicates an example of calculating an average speed of the MS by extending the method of Equation 2.

$$\frac{(\alpha_1)S_1 + (\alpha_2)S_2 + (\alpha_3)S_3 + \ldots + (\alpha_n)S_n}{\alpha_1 + \alpha_2 + \alpha_3 + \ldots + \alpha_n} \quad \text{[Equation 3]}$$

where n denotes the number of sampling intervals and $\alpha(0 \leq \alpha \leq 1)$ denotes a weight value according to time. Accordingly, the average speed may be obtained by applying a weight to a speed value of a specific time according to the range of $\alpha$. The reason why more weight is applied to a recent speed is that a current speed of the MS may have a greater effect upon a speed of the MS in the near future. To apply more weight to a recent speed of the MS, if a number is increased in order of $\alpha 1, \alpha 2, \ldots,$ an, a weight may be increased in order of $\alpha 1 < \alpha 2 < \ldots < \alpha n$.

The MS may transmit the traveling speed thereof calculated as described above to a BS in the form of being included in a MOB_DREG-REQ message upon entering an idle mode. The BS or paging controller may assign a hierarchical paging group based on speed information included in the MOB_DREG-REQ message. Therefore, the BS or paging controller may assign the hierarchical paging group to the MS using a MOB_DREG-CMD message.

Figure 6:
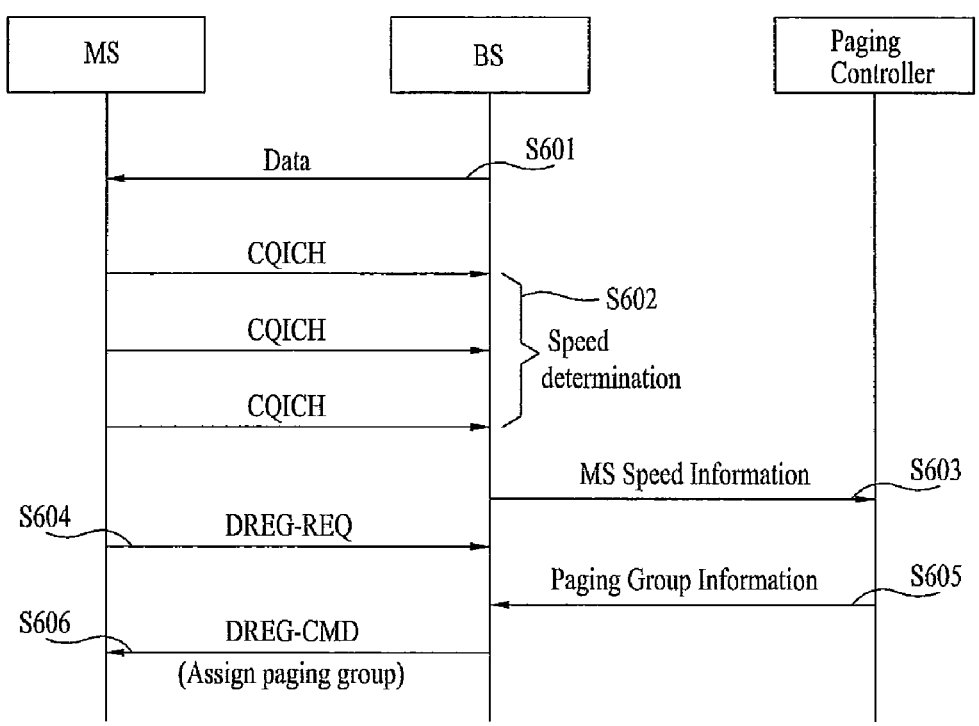
FIG. 6 illustrates a method for a BS to calculate a traveling speed of an MS according to an exemplary embodiment of the present invention.

FIG. 6 illustrates a method for a BS to calculate a traveling speed of an MS according to an exemplary embodiment of the present invention.

The BS may calculate a speed of the MS using a channel quality indicator channel report (CQICH) message transmitted periodically by the MS.

Referring to FIG. 6, a BS in a normal mode may transmit data to an MS at various time intervals (step S601).

The MS may transmit, to the BS, CQICHs for the data received from the BS. The BS may receive the CQICHs and may calculate a traveling speed of the MS (step S602).

The BS may transmit MS speed information calculated in step S602 to a paging controller. The paging controller may be present separately from the BS as an additional entity or may be present within the BS as an upper entity (step S603).

The MS may transmit a MOB_DREG-REQ message to the BS to enter an idle mode (step S604).

The BS or paging controller may assign a paging group to the MS using speed information of the MS obtained in step S602 or S603. The paging group may be a hierarchical paging group described in conjunction with FIG. 3. The paging controller may assign the hierarchical paging group to the MS based on the speed information of the MS and may transmit paging group information about the paging group, for example, a paging group ID to the serving BS (step S605).

The BS may transmit the paging group information about the assigned hierarchical paging group, received from the paging controller, to the MS using a MOB_DREG-CMD message (step S606).

In FIG. 6, the BS acquires the speed information of the MS and the paging controller determines the paging group, which is to be assigned to the MS, using the MS speed information. However, the BS may determine the paging group, which is to be assigned to the MS, using the speed information of the MS according to a user request or a corresponding communication environment.

Figure 7:
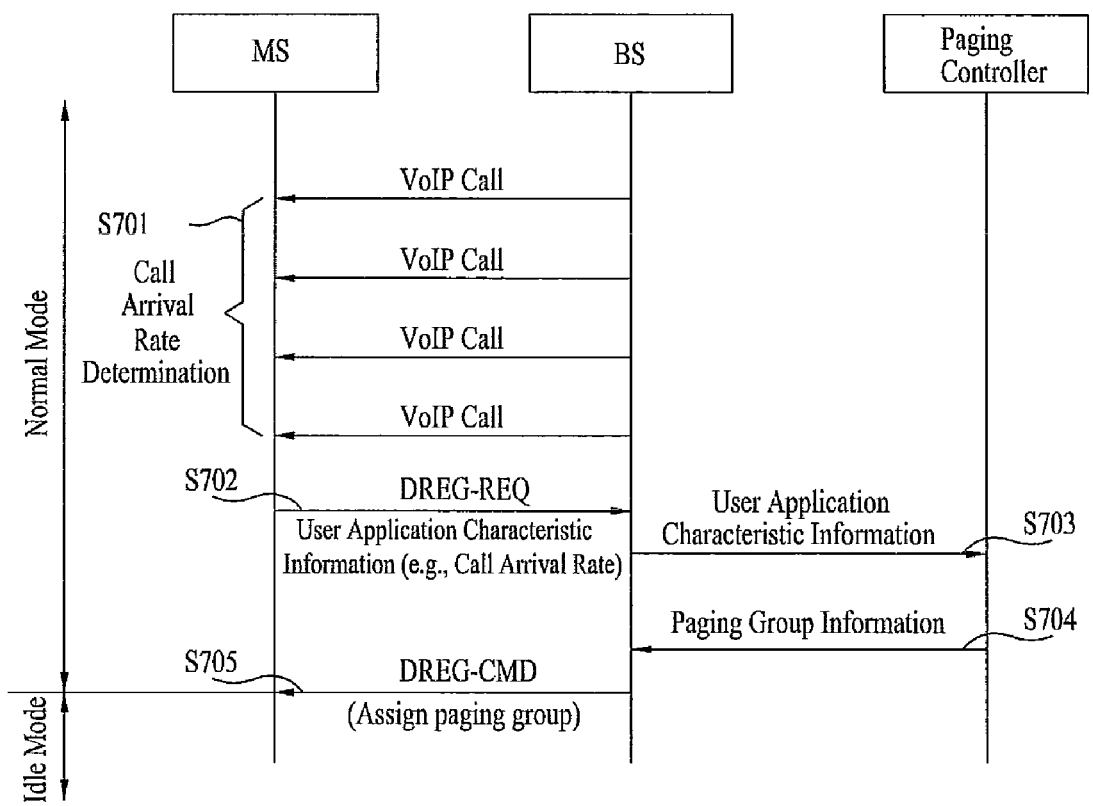
FIG. 7 illustrates a method for allocating a paging group using user application characteristic information according to an exemplary embodiment of the present invention.

FIG. 7 illustrates a method for allocating a paging group using user application characteristic information according to an exemplary embodiment of the present invention.

When an MS enters an idle mode, a paging controller may assign a one or more paging group to the MS using user application characteristic information. In the exemplary embodiments of the present invention, a voice over Internet protocol (VoIP) service, which is a type of user application characteristic information, is used. It is apparent that other user application characteristic information may be used.

In a normal mode, a BS may transmit one or more VoIP calls to an MS. The MS may determine a call arrival rate and/or its mobility using the VoIP calls (step S701).

To enter an idle mode, the MS may transmit a MOB_DREG-REQ message to the BS. In this case, the MS may transmit, to the BS, the DREG-REQ message including the user application characteristic information (e.g., call arrival rate) acquired in step S701. In the case, the MS may further include its mobility information to the DREG-REQ message (step S702).

The BS may transmit the call arrival rate (i.e. user application characteristic information) and/or the mobility information received from the MS to the paging controller (step S703).

The paging controller may assign an optimal paging group to the MS using the call arrival rate and/or the mobility information of a current MS. Namely, if the call arrival rate and/or the mobility information received from the MS in a normal mode are/is greater than a prescribed reference value, the paging controller may assign an SPG (e.g. primary paging group) to the MS when the MS enters the idle mode. If the call arrival rate and/or the mobility information are/is less than the prescribed reference value, the paging controller may assign an LPG (e.g. secondary paging group) to the MS. The paging controller may transmit, to the BS, paging group information about the paging group assigned to the MS (step S704).

At the step of S704, when the MS is assigned to more than one paging groups, one of the mobile station's paging groups is called primary paging group and rest of the assigned paging group is called secondary paging group. For instance, small paging group (SPG) can be used as primary paging group, large paging group (LPG) can be used as secondary paging group. Of course, if the LPG may be set to primary paging group, than the SPG is set to secondary paging group. When an MS is assigned to only one paging group, the paging group is considered as a primary paging group.

The BS may transmit a DREG-CMD message including the information about the paging group, received from the paging controller, to the MS (step S705).

Upon receiving the MOB_DREG-CMD message, the MS may efficiently check a paging message using a hierarchical paging group included in the MOB_DREG-CMD message. That is, referring to FIG. 7, the BS or paging controller may assign an optimal hierarchical paging group to the MS, which enters the idle mode, using the user application characteristic information and/or the mobility information in the normal mode.

The following Table 1 illustrates an example of a MOB_DEG-REQ message format which may be used in the exemplary embodiments of the present invention.

TABLE 1

| Syntax | Size (bit) | Notes |
|---|---|---|
| MOB_DREG-REQ_Message_format( ) { | | |
| ~ | | |
| User Application Characteristic | | Bit #0: Call arrival rate |
| | | Bit #1~7: Reserved |
| MS Mobility Information | | Bit #0: MS speed |
| | | Bit #1: Number of handovers in normal mode |
| MS Paging Group Type | | 0: Paging group for high mobility MS |
| | | 1: Paging group for low mobility MS |
| ~ | | |
| } //End of MOB_DREG-REQ | | |

Referring to Table 1, the MOB_DREG-REQ message transmitted by the MS to the BS to enter the idle mode may include at least one of the MS speed information (e.g., MS mobility information) and the user application characteristic information. The user application characteristic information may have a size of 8 bits. In this case, one bit (e.g., bit#0) indicates that the call arrival rate is used. The MS speed information may have a size of 2 bits, the first bit (bit#0) indicating the traveling speed of the MS and the second bit (bit#1) indicating the number of handovers in a normal mode during a specific period of time.

In Table 1, the MOB_DREQ-REQ message may further include a field indicating an MS paging group type. For example, the MS paging group type may be indicated by one bit. The MS paging group type of '0' may indicate a paging group for high mobility MS and the MS paging group type of '1' may indicate a paging group for low mobility MS.

The MS paging group type field may be used when the MS determines a paging group under a specific condition and may be disregarded when the BS or paging controller arbitrarily assigns the paging group to the MS.

The following Table 2 shows an example of a MOB_DEG-CMD message format which may be used in the exemplary embodiments of the present invention.

TABLE 2

| Syntax | Size | Notes |
|---|---|---|
| MOB_DREG-CMD_Message_format( ) { | | |
| ~ | | |
| User Application Characteristic | | Bit #0: Call Arrival Rate |
| | | Bit #1~7: Reserved |
| MS Mobility Information | | Bit #0: MS Speed |
| | | Bit #1: Number of handovers in normal mode |
| MS Speed Threshold | | MS speed threshold for determination about paging group type of MS. |
| Paging Information | | 1. PAGING_CYCLE - Cycle at which paging message is transmitted within paging group. |
| | | 2. PAGING_CYCLE_INDEX - determines cycle at which paging message is transmitted. |
| | | 3. LARGE_PAGING_GROUP_OFFSET - determines frame within cycle at which paging message is transmitted. Must be smaller than PAGING_CYCLE value. |
| | | 4. SMALL_PAGING_GROUP_OFFSET - determines frame within cycle at which paging message is transmitted. Must be smaller than PAGING_CYCLE value. |
| | | 5. Large Paging-group-ID - ID of large paging group assigned to MS. |
| | | 6. Small Paging-group-ID - ID of small paging group assigned to MS. |
| | | 7. Small Paging Group Change Count - Number of changes of small paging groups. |
| | | 8. BS Change Count - Number of changes of BSs |
| ~ | | |
| } //End of MOB_DREG-CMD | | |

Referring to Table 2, the MOB_DREG-CMD message format may include at least one of an MS speed information (e.g., MS mobility information) field, a user application characteristic field, and a paging information field. The MOB_DREG-CMD message field may selectively include an MS speed threshold field.

MS speed information, user application characteristic information, and paging information may be included in a ranging request (MOB_RNG-REQ) message and a ranging response (MOB_RNG-RSP) message which are transmitted and received to perform location update after the MS enters an idle mode and an MS speed threshold may be transmitted through a broadcast channel (BCH).

The MS speed threshold is received by the MS through the BCH in a normal mode and may be used to determine a paging group when the MS enters the idle mode. Even after the MS enters the idle mode, the MS speed threshold may again be used to determine the paging group of a corresponding MS by receiving the BCH at a prescribed interval.

Referring back to Table 2, the paging information field may include at least one of a paging cycle indicating a cycle at which a paging message is transmitted, a paging cycle index determining the paging cycle, an LPG offset indicating a frame in which a paging message is transmitted to an LPG, an SPG offset indicating a frame in which a paging message is transmitted to an SPG, an LPG ID and an SPG ID indicating a paging group assigned to an MS, an SPG change count indicating the number of SPGs between which the MS travels, and a BS change count indicating the number of BSs between which the MS travels.

The following Table 3 shows another example of the MS mobility information transmitted to the BS to determine the paging group assigned to the MS.

TABLE 3

| Syntax | Size (bit) | Notes |
|---|---|---|
| MS Mobility Information | | Bit #0: Current MS Speed |
| | | Bit #1: Average MS Speed |

Table 3 may be used instead of the MS mobility information listed in Table 1 and Table 2. The MS mobility information may have a 2-bit size, the first bit denoting a current MS speed and the second bit denoting an average MS speed at a specific duration. The average speed of the MS may be calculated using the methods described with reference to FIGS. 4 and 5.

The following Table 4 shows another example of the MS mobility information which may be included in the MOB_DREG-REQ/MOB_DREG-CMD message.

TABLE 4

| Syntax | Size (bit) | Notes |
|---|---|---|
| MS Mobility Information (MS speed) | 1 | Bit #0: Low Speed Bit #1: High Speed |

The following Table 5 shows another example of the MS mobility information which may be included in the MOB_DREG-REQ/MOB_DREG-CMD message.

TABLE 5

| Syntax | Size (bit) | Notes |
|---|---|---|
| MS Mobility Information (MS speed) | 2 | 0b00: Low Speed 0b01: Medium Speed 0b10: High Speed 0b11: Reserved |

The MS mobility information included in the MOB_DREG-REQ message and/or the MOB_DREG-CMD message may be confirmed through Table 4 and Table 5. In Table 4 and Table 5, approximate speed values rather than detailed speed values are included in the MOB_DREG-REQ/MOB_DREG-CMD message to inform a network of the values. Namely, in Table 4, whether the MS speed is fast or slow is indicated as one bit, and in Table 5, the MS speed including a medium speed is indicated as 2 bits.

2. Method for Changing Paging Group from SPG to LPG

Another exemplary embodiment of the present invention provides a method for changing a paging group. The method includes methods of changing the paging group from an SPG to an LPG, from an LPG to an SPG, and from a specific LPG to another LPG.

The method for changing the paging group from the SPG to the LPG will now be described first.

In the exemplary embodiments of the present invention, a paging method using the SPG and LPG is carried out when an MS informs a paging controller of the location thereof by performing location update in a network. However, when the MS travels at high speed, since a probability of frequently changing the SPG is high, signaling overhead may be increased due to continuous location update.

Therefore, a further exemplary embodiment of the present invention provides a method for changing the paging group from a specific SPG to an LPG, if a high-speed MS travels between SPGs as many times as a threshold or more of an SPG change count during an interval of an SPG change timer.

The SPG change count refers to a value increased by one whenever the MS changes the SPG. An SPG change count parameter and/or a BS change count parameter may be included in at least one of a primary BCH (PBCH) and a secondary BCH (SBCH) of a BCH. The SPG change count may also be included in a MOB_RNG-REQ message and/or a MOB_RNG-RSP message transmitted and received by the MS to perform location update. If an SPG change count value exceeds an SPG change threshold, the paging group of the MS may be changed from the SPG to the LPG.

The SPG change threshold is a parameter for preventing excessive location update of the MS. The SPG change threshold parameter may be included in the BCH, desirably, in either the PBCH or SBCH of the BCH. The SPG change threshold parameter may also be included in the MOB_RNG-REQ message and/or the MOB_RNG-RSP message transmitted and received by the MS to perform location update.

Upon traveling between the SPGs as many times as a threshold value (N times) or more before the SPG timer has expired, the MS may request a network (e.g., a BS and/or paging controller) to change a paging group thereof (e.g., from an SPG to an LPG). It is possible for the BS or paging controller to request that the MS change the paging group of the MS. In another exemplary embodiment of the present invention, it is assumed that the MS determines the change of the paging group and performs location update.

The SPG timer is used to change an SPG of the MS. If the SPG is allocated the MS, the SPG timer is driven. If the SPG timer has expired, the MS may re-set the SPG timer.

Figure 8:
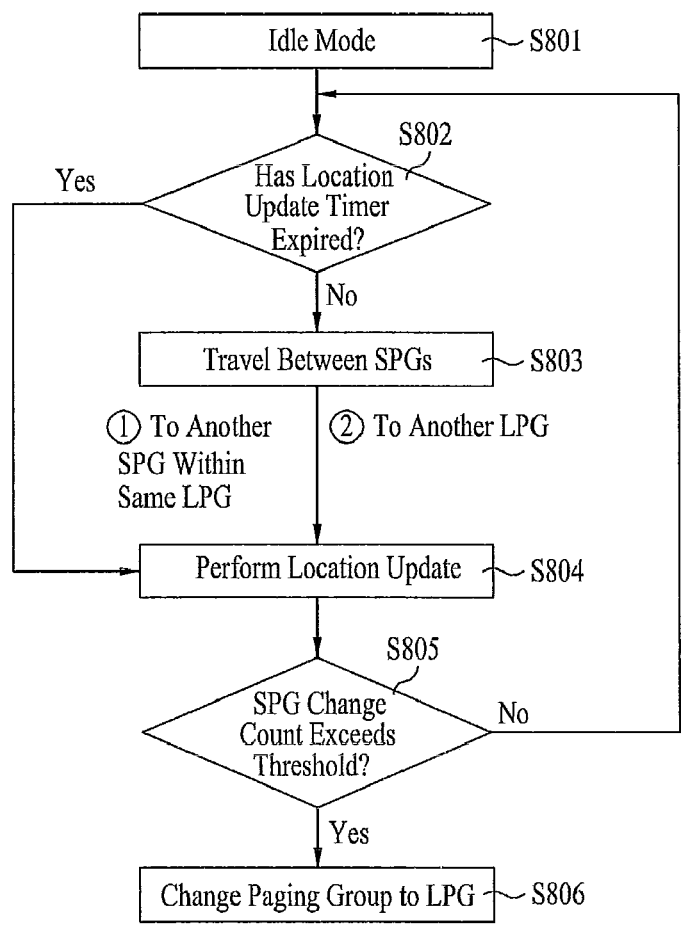
FIG. 8 illustrates a process for an MS to change a paging group according to another exemplary embodiment of the present invention.

FIG. 8 illustrates a process for an MS to change a paging group according to another exemplary embodiment of the present invention.

Referring to FIG. 8, an MS may travel between multi-cell areas in an idle mode (step S801).

After entering the idle mode, the MS may set a location update timer. Accordingly, the MS may perform different operations depending on whether the location update timer has expired (step S802).

If the location update timer has expired in step S802, the MS may perform location update with a BS of an SPG to which the MS belongs.

If the location update timer has not expired in step S802, the MS may travel between multi-cell areas, for example, from a current SPG to another SPG (step S803).

At this time, the MS may perform location update with a BS of another SPG (step S804).

The location update in step S804 may be performed with respect to the following two cases. First, the location update may be performed when the MS travels to another SPG within the same LPG. Second, the location update may be performed when the MS travels from a current LPG to another LPG, or from an SPG of the current LPG to an SPG of another LPG. When the MS travels to another LPG, it is desirable that the location update be performed irrespective of a threshold of an SPG change count.

The MS may calculate the SPG change count whenever the location update is performed (step S805).

If the SPG change count does not exceed a predefined threshold in step S805, it is determined whether the location update timer has expired in step S802. If the location update timer has not expired, steps S803 to S805 may be repeated until the SPG change count reaches the threshold.

If the SPG change count exceeds the threshold in step S805, the MS does not perform the location update and attempts to change a paging group. Namely, when the MS travels between SPGs a maximum of N times, the MS may change a paging group from an SPG to an LPG. In this case, it is possible to perform location update only when the paging group of the MS is changed to the LPG and even though the MS travels again between the SPGs, the location update may not be performed. Thus, the MS may reduce overhead caused by frequent location update (step S806).

In the exemplary embodiments of the present invention, the MS, BS and/or paging controller may set respective SPG change counts. FIG. 8 illustrates a process for changing a paging group based on a value of the SPG change count included in the MS. If a condition that the SPG change count in the BS or paging controller changes the paging group is satisfied, the BS or paging controller may attempt to change the paging group.

As another aspect of the exemplary embodiment of FIG. 8, the network and/or the MS may change a paging group of the MS based on speed information of the MS. For example, the network may change the paging group of the MS using a specific speed threshold (e.g., low, medium, or high).

The network may assign the speed threshold to the MS through a BCH. The MS may receive a registration response (MOB_REG-RSP) message, a ranging response (MOB_RNG-RSP) message, or a subscriber station basic capability response (SBC-RSP) message, etc., including the specific speed threshold, upon entering the network.

The MS may change the paging group using the specific speed threshold as follows.

If the speed of the MS belonging to an LPG is less than a medium speed threshold or similar to a low speed threshold, the MS may perform location update with the network. At this time, the MS may transmit a ranging request message including speed information thereof to the network during the location update.

If the speed of the MS belonging to an SPG is above a high speed threshold, the MS may perform location update. During the location update, the MS may report the ranging request message including speed information thereof to the network. The network may assign a new paging group to the MS based on the speed information reported by the MS.

In the exemplary embodiments of the present invention, the network has an extensive concept including the BS and/or the paging controller. The specific speed threshold may have two states: a high speed threshold and a low speed threshold. Then the MS belonging to an SPG may perform location update with the network when the speed thereof exceeds the high speed threshold. In addition, the MS belonging to an LPG may perform location update with the network when the speed thereof is below the low speed threshold.

In the exemplary embodiments of the present invention, the high speed threshold, medium speed threshold, and low speed threshold do not designate specific boundary values and indicate speed values which are varied according to system state or channel environment. Accordingly, such speed threshold values have a characteristic of dividing the traveling speed of the MS into three categories.

Figure 9:
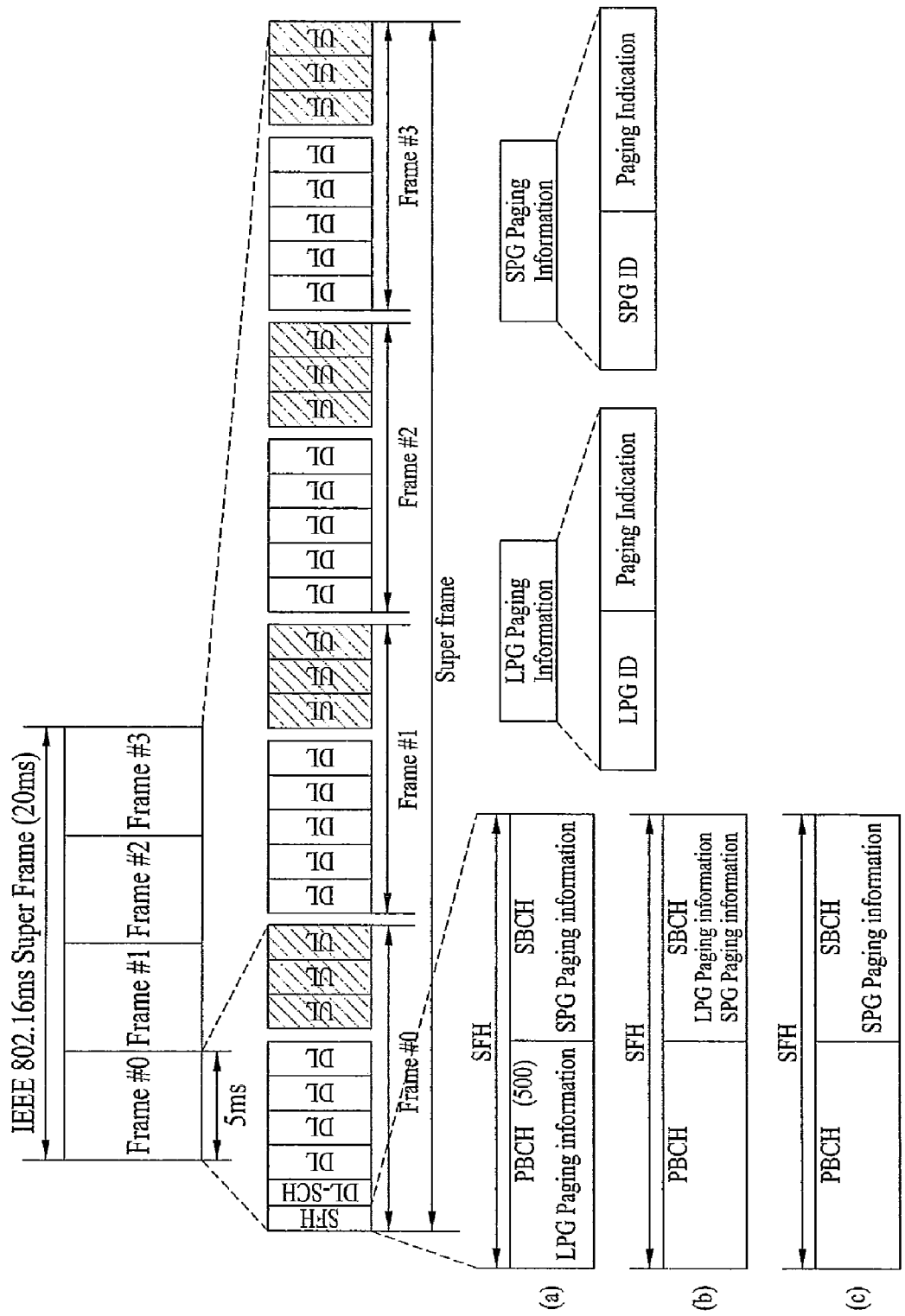
FIG. 9 illustrates a frame structure of a hierarchical paging group according to another exemplary embodiment of the present invention.

FIG. 9 illustrates a frame structure of a hierarchical paging group according to another exemplary embodiment of the present invention.

An MS may judge whether it has moved to another paging group by comparing a paging group ID field included in a BCH of a super-frame header (SFH) with a paging group ID assigned upon entering an idle mode.

The MS may perform location update under the following situations. First, the location update is performed when an LPG is changed, thereby obtaining paging information such as a new LPG ID.

Moreover, the MS may perform location update when traveling between SPGs a threshold number of times or more during a specific time-(e.g., an SPG change count). In this case, the MS may request a change of a paging group to which the MS belongs to an LPG from an SPG.

If a location update timer has expired, the MS may acquire paging information about a paging group thereof by performing location update.

If the speed of the MS belonging to an SPG exceeds a high speed threshold, the MS may perform location update with a network. If the speed of the MS belonging to an LPG is similar to a medium speed threshold or below a low speed threshold, the MS may perform the location update with the network.

The MS performs the location update for the above-described cases and thus can obtain paging information about a paging group thereof. Further, the MS informs the BS or paging controller of a current location thereof, thereby effectively performing paging.

Referring to FIG. 9, one super-frame (e.g., 20 ms) may be comprised of four frames and one frame (e.g., 5 ms) may be comprised of 8 sub-frames. An super frame header (SFH) and a downlink scheduling channel (DL_SCH) may be assigned to the first sub-frame of the first frame Frame#0.

The SFH may include a BCH which may be divided into one or more channel regions. In the exemplary embodiments of the present invention, it is assumed that one BCH is comprised of a PBCH and an SBCH.

Information used commonly in a network, preferably information which is not easily varied according to a cell, may be transmitted through the PBCH. Information used in a specific cell or a specific SPG may be transmitted through the SBCH. It is desirable that information which varies according to a specific cell or a specific SPG be transmitted through the SBCH.

Hereinafter, an allocation structure of the BCH included in the SFH when the hierarchical paging group of FIG. 3 is used will be described.

Referring to FIG. 9(a), a primary BCH (PBCH) may include LPG paging information and a secondary BCH (SBCH) may include SPG paging information.

FIG. 9(a) may be applied when one network is constructed by one LPG. That is, since the network is comprised of one LPG, an LPG paging indicator may use a fixed value. Accordingly, the LPG paging information may be included in the PBCH and the SPG paging information may be included in the SBCH.

Referring to FIG. 9(b), an SBCH may include LPG paging information and SPG paging information. FIG. 9(b) may be applied when one network includes one or more LPGs and an SPG ID is additionally assigned according to each LPG (refer to description in FIG. 3). When an MS travels between LPGs, a paging indicator is varied according to the LPGs. Therefore, the LPG paging information is desirably included in the SBCH. Information used commonly in the network may be assigned to the PBCH.

Referring to FIG. 9(c), information used commonly in the network may be assigned to the PBCH and SPG paging information may be assigned to the SBCH. FIG. 9(c) shows a frame structure which may be used when the SPG is independently assigned of the LPG (refer to description in FIG. 3). The MS can recognize information about the LPG including a corresponding SPG by confirming an SPG ID included in the SPG paging information.

In FIGS. 9(a) to 9(c), the LPG paging information may include an LPG ID and a paging indicator and the SPG paging information may include an SPG ID and the paging indicator.

3. Method for Changing Paging Group from LPG to SPG

As another exemplary embodiment of the present invention, a method for changing a paging group from an LPG to an SPG will now be described.

In the exemplary embodiments of the present invention, a method for constructing a paging group using the SPG and LPG is provided. In the exemplary embodiments of the present invention, when an MS travels between SPGs a prescribed number of times, a paging group is changed to the LPG. Therefore, since MSs belonging to the SPG change a paging group to the LPG after passage of sufficient time, the number of MSs belonging to the LPG is increased. This may act as overhead in terms of both the MS and BS.

Namely, the MS may consume unnecessary power in order to confirm whether a paging message transmitted to the MS is present even if a paging controller has not paged the MS. Further, in the BS, a problem of increasing a size of a paging message that should be transmitted to the MS may occur.

Accordingly, another exemplary embodiment of the present invention discloses a location update method in which the MS changes a paging group from an LPG to an SPG in a hierarchical paging structure.

Figure 10:
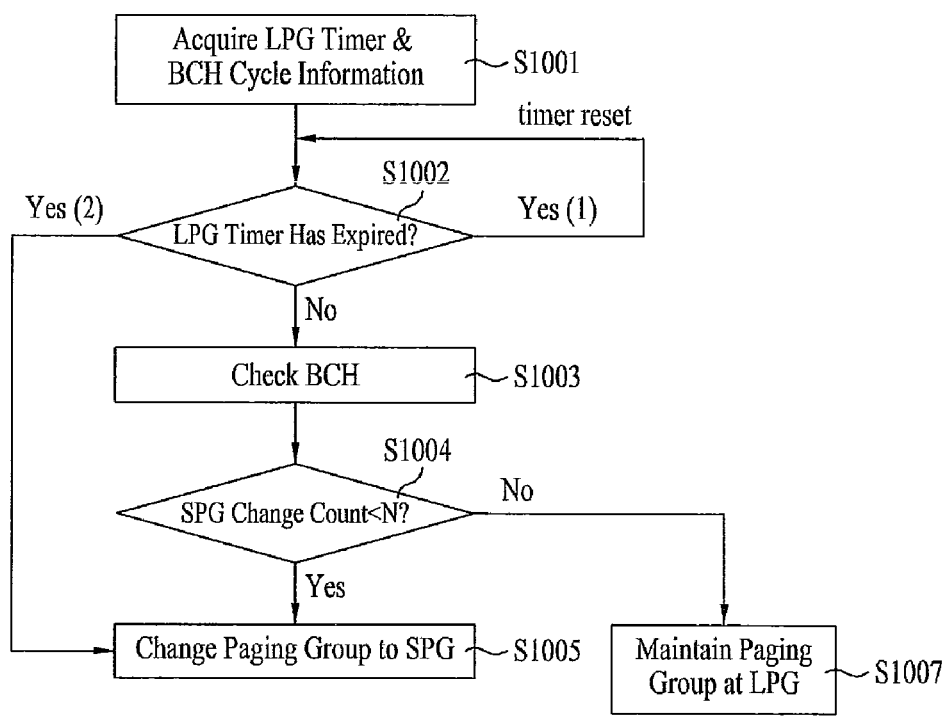
FIG. 10 illustrates a method for changing a paging group according to another exemplary embodiment of the present invention.

FIG. 10 illustrates a method for changing a paging group according to another exemplary embodiment of the present invention.

Referring to FIG. 10, an MS may acquire paging information including an LPG timer (TLPG; LPG Timer) field (LPG timer information) and BCH cycle information (PBCH_CHECK_IN_IDLE_MODE) from a serving BS. The LPG timer field denotes time during which the MS belongs to an LPG and refers to a parameter used to change an LPG of the MS. If the LPG is assigned to the MS, an LPG timer operates. If the LPG timer has expired, the MS may reset the LPG timer. The BCH cycle information indicates a fixed or variable cycle for searching for a BCH to check whether a paging group to which the MS belongs is changed. The LPG timer field and BCH cycle information may be included in the BCH, preferably, in either a PBCH or an SBCH of the BCH (step S1001).

In step S1001, the LPG timer and BCH cycle information may be assigned from a BS if the LPG is assigned to the MS or a paging group of the MS is changed from an SPG to the LPG when the MS enters an initial idle mode. If the LPG is initially assigned to the MS, the paging information may be included in an MOB_DREG-CMD message. If the paging group of the MS is changed from the SPG to the LPG, the paging information may be included in an MOB_RNG-RSP message. A BCH cycle is used to perform location update and is preferably shorter than an LPG timer interval.

The LPG timer operates starting when the LPG is assigned to the MS (step S1002).

If the LPG timer has not expired, the MS may check the BCH at a fixed cycle according to the BCH cycle information (step S1003).

The MS may determine a change of a paging group by checking whether the MS changes SPGs a threshold number of times, (N times), during a specific time period (e.g., an interval of the LPG timer). At this time, the MS may check the number of changes of the paging group of the MS using an SPG change count (step S1004).

In step S1004, a BS change count may be used instead of the SPG change count. The BS change count indicates how many times the MS changes BSs. Accordingly, the MS, BS or paging controller may determine whether the paging group is changed using the BS change count by checking whether the MS changes the BS a prescribed number of times.

If the SPG change count of the MS is less than a threshold (N times), the MS and/or BS may determine that the MS has low mobility. Then the MS may determine a change of the paging group from the LPG to the SPG. In this case, the MS may perform location update to change the paging group from LPG to SPG (step S1005).

If the SPG change count is greater than the threshold (N times), the MS and/or BS determine that the MS has high mobility so that the paging group of the MS is maintained at the LPG without change (step S1007).

If the LPG timer has expired in step S1002, the MS may implement the following two operations.

One ('Yes(1)') is to maintain the LPG by resetting the LPG timer and to check the BCH according to the BCH cycle information. At this time, the paging group to which the MS belongs may be changed or maintained according to the SPG change count.

The other ('Yes(2)') is to change the paging group to the SPG. In the exemplary embodiments of the present invention, the MS and BS use the SPG change count. If the MS belonging to the LPG continues to belong to the LPG, a large number of MSs belong to the LPG eventually. Then a problem of increasing overhead in a system cannot be solved. Accordingly, if the LPG timer has expired, it is desirable that the MS change the paging group from the LPG to the SPG.

Figure 11:
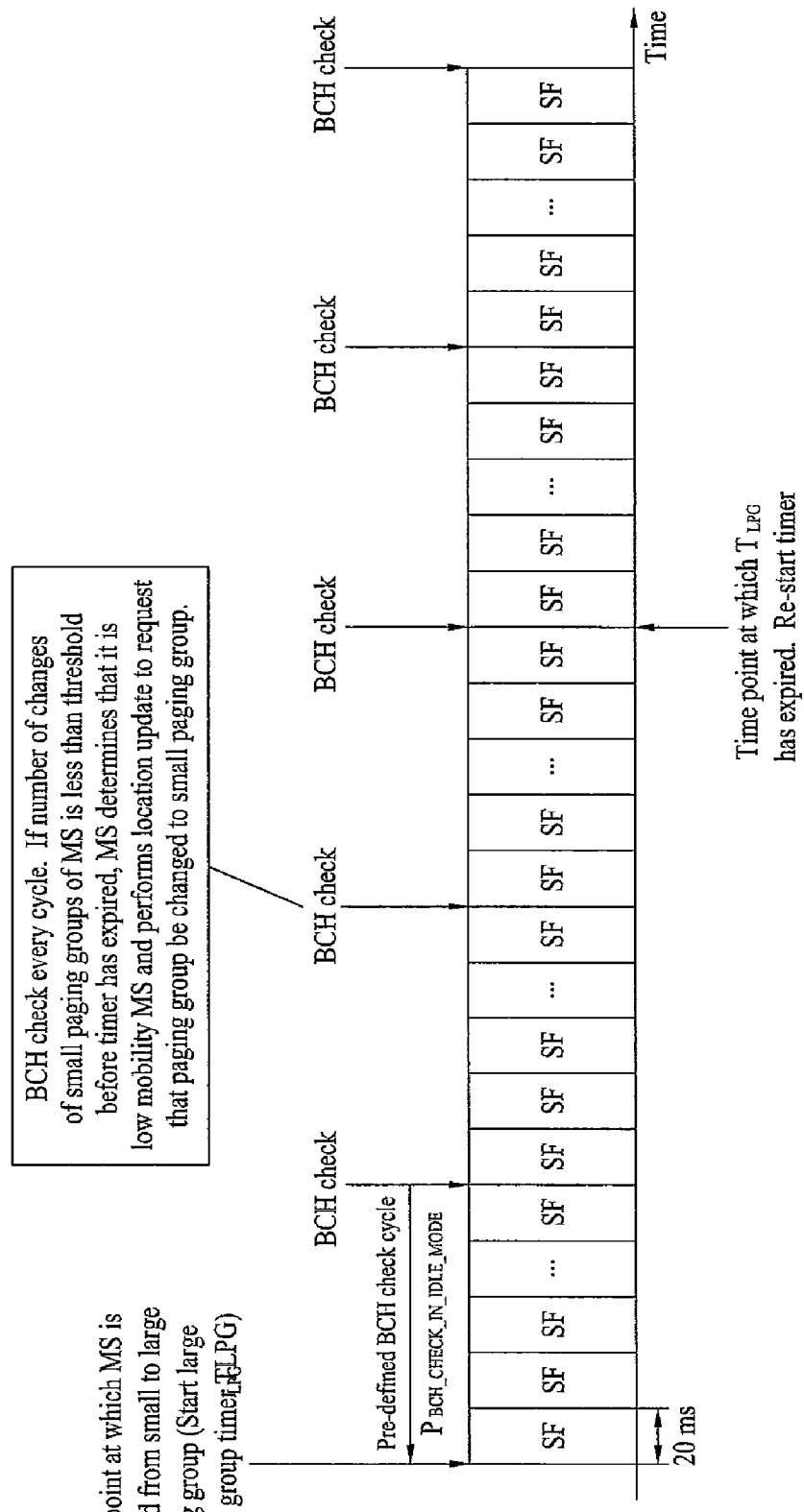
FIG. 11 illustrates a location update method for changing a paging group from an LPG to an SPG according to another exemplary embodiment of the present invention.

FIG. 11 illustrates a location update method for changing a paging group from an LPG to an SPG according to another exemplary embodiment of the present invention.

If a paging group is changed from the SPG to the LPG or the paging group is initially assigned to the LPG, the MS may acquire paging information including LPG timer and BCH cycle information. Accordingly, the MS may check a downlink channel (e.g., a BCH) to confirm whether a paging group is changed every predefined cycle according to BCH cycle information.

The MS may confirm the BCH every predefined cycle (e.g., a fixed cycle) during a specific time using an LPG timer started when the LPG is assigned to the MS. If the SPG included in the BCH is not changed a threshold number of times or more, the MS may determine that it is a low mobility MS. Accordingly, the MS may perform location update to request a paging controller to change a paging group from the LPG to the SPG.

Using a description in FIG. 11, the MS may perform location update only for a necessary case instead of performing the location update whenever a timer has expired in a legacy system, thereby reducing uplink overhead and paging overhead.

As another aspect of the present invention, a prescribed parameter (e.g., MS speed threshold of Table 1) which is used by the MS to determine a paging group type may be included in the BCH transmitted at a predefined cycle in FIG. 11. Even when entering an idle mode, the MS may maintain or change a paging group type thereof using such a prescribed parameter.

For example, if the speed of the MS is above a threshold (received through a DREG-CMD or BCH), the MS, a current paging group of which is the SPG, may perform location update to request a change of the paging group type from the SPG to the LPG. If the speed of the MS is below the threshold (received through the DREG-CMD), the MS may maintain the previous paging group.

4. Method for Changing Paging Group from One LPG to Another LPG

A network system may include one or more LPGs. Then an MS may travel from a specific LPG to another LPG and at this time the MS may perform location update.

5. Method for Performing Location Update for Change of Paging Group

Figure 12:
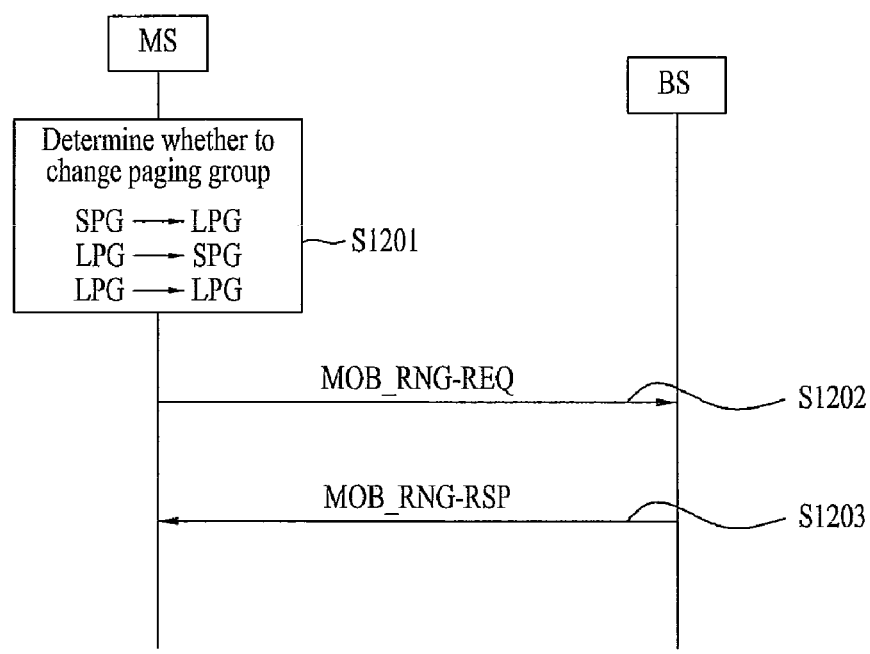
FIG. 12 illustrates a location update process for changing a paging group according to exemplary embodiments of the present invention.

FIG. 12 illustrates a location update process for changing a paging group according to another exemplary embodiment of the present invention.

The MS is assigned to more than one paging groups. In this case, one of the mobile station's paging groups is called primary paging group and rest of the assigned paging group is called secondary paging group. For instance, Small paging group (SPG) can be used as primary paging group, large paging group (LPG) can be used as secondary paging group. Of course, if the LPG may be set to primary paging group, than then the SPG is set to secondary paging group.

Referring to FIG. 12, an MS may determine whether to change a paging group. The change of the paging group may be performed according to the above-described embodiments (e.g. FIG. 8 to 11) of the present invention and may be one of changes from an SPG to an LPG, from an LPG to an SPG, and from an LPG to another LPG (step S1201).

In the exemplary embodiments of the present invention, the MS has mainly determined the change of the paging group. However, a BS or paging controller may request the change of the paging group of the MS according to user demands or communication environments.

The MS may perform location update with a current BS to change the paging group. Accordingly, the MS may transmit a ranging request (MOB_RNG-REQ) message including the MS mobility information to the BS. In this case, the MS mobility information may be used to assign new paging group(s) to the MS (step S1202).

The following Table 6 shows an example of an MOB_RNG-REQ message format.

TABLE 6

| Syntax | Size (bit) | Notes |
| --- | --- | --- |
| MOB_RNG-REQ_Message_format( ) { | — | — |
| Paging controller ID | | |
| ~ | | |

TABLE 6-continued

| Syntax | Size (bit) | Notes |
|---|---|---|
| Paging Group ID | | Paging group ID (large paging group ID or small paging ID) to be changed by MS |
| User Application characteristic | | Bit #0: Call arrival rate<br>Bit #1~#7: Reserved |
| MS Mobility Information | | 0b00: Low Speed<br>0b01: Medium Speed<br>0b10: Fast Speed<br>0b11: reserved |
| ~<br>} //End of MOB_RNG-REQ | | |

Table 6 shows the MOB_RNG-REQ message used when the MS directly determines whether to change a paging group. Referring to Table 6, the MOB_RNG-REQ message may include a paging controller ID and a paging group ID. The paging group ID indicates an ID of a paging group to be changed by the MS and may be either an LPG ID or an SPG ID. The LPG ID and SPG ID correspond to IDs of a paging group included in a BCH checked according to BCH cycle information.

The following Table 7 shows another example of the MOB_RNG-REQ message format.

TABLE 7

| Syntax | Size (bit) | Notes |
|---|---|---|
| MOB_RNG-REQ_Message_format( ) {<br>~<br>Paging controller ID | | |
| Location update type | | 0: Large paging group<br>1: Small paging group |
| User Application characteristic | | Bit #0: Call arrival rate<br>Bit #1~7: Reserved |
| MS Mobility Information | | 0b00: Low Speed<br>0b01: Medium Speed<br>0b10: Fast Speed<br>0b11: reserved |
| ~<br>} //End of MOB_RNG-REQ | | |

Table 7 shows the MOB_RNG-REQ message used when a paging controller determines a paging group assigned to the MS. The MOB_RNG-REQ message of Table 7 may include a paging controller ID and a location update type. The MS may determine whether to change the paging group based on a state thereof (e.g., a paging group change count or an MS speed).

Referring to Table 7, a location update type field may have a size of one bit, '0' indicating an LPG and '1' indicating an SPG. The MS may select one of the location update types, (e.g., LPG or SPG), and may transmit the selected type to a network. The paging controller receiving the MOB_RNG-REQ message may determine a paging group of the MS according to the location update types. The paging controller or BS may inform the MS of an assigned paging group through a paging information field of an MOB_RNG-RSP message.

In Table 6 and Table 7, the MOB_RNG-REQ message may further include at least one of user application characteristic information and MS mobility information. The user application characteristic information and MS mobility information may perform the same function described with reference to Table 1 to Table 5.

Referring back to FIG. 12, the BS receiving the MOB_RNG-REQ message from the MS in step S1202 may assign a new paging group to the MS. The BS may assign the new paging group of different size to the MS based on the MS mobility information. Therefore, the BS is able to notify information related with the new paging group using the MOB_RNG-RSP message (step S1203).

The following Table 8 shows an example of the MOB_RNG-RSP message transmitted to change the paging group of the MS.

TABLE 8

| Syntax | Size (bit) | Notes |
|---|---|---|
| MOB_RNG-RSP_Message_format( ) {<br>~ | — | — |
| Location update trigger TLV description field | | Refer to Table 9 |
| Paging Information | | Refer to Table 10 |
| Paging controller ID<br>~<br>} //End of MOB_RNG-RSP | | |

Referring to Table 8, the MOB_RNG-RSP message may include a location update trigger TLV description field, a paging information field, and a paging controller ID.

The following Table 9 shows an example of a location update trigger TLV description field format.

TABLE 9

| Name | Length (byte) | Value |
|---|---|---|
| Type<br>Function | 1 | Computation defining trigger condition:<br>0x0: Success of location update<br>0x1: Failure of location update<br>0x2: Success of location update and DL traffic pending<br>0x3: Success of paging group change<br>0x4: Failure of paging group change<br>0x5~0x7: Reserved |
| Actions | 1 | Action performed upon reaching trigger condition:<br>0x0: Respond to RNG-RSP after assigning paging group ID in Paging Information Field.<br>0x1: Respond to RNG-REQ for paging group change after expiring the Tx timer.<br>0x2: Respond to RNG-REQ for paging group change up to MAX n times.<br>0x3: Exit from idle mode<br>0x4~0x7: Reserved |

Table 9 shows an example of the location update trigger TLV description field format which may be used in the exemplary embodiments of the present invention.

Referring to Table 9, a location update trigger TLV description field may include a type parameter, a function parameter, and an action parameter. The type parameter indicates the location update type listed in Table 9. The function parameter may have a size of one byte, bit 0×0 denoting success of location update, 0×1 denoting failure of location update, 0×2 denoting success of location update and DL traffic pending, 0×3 denoting success of paging group change, 0×4 denoting failure of paging group change, and 0×5 to 0×7 denoting reserved values.

In Table 9, the action parameter may have a size of one byte, bit 0×0 indicating that the MOB_RNG-RSP message includes a paging group ID after allocating a paging group, 0×1 indicating that location update is re-attempted for a change of the paging group after a transmission timer has expired, 0×2 indicating that ranging request is re-attempted for location update when the paging group is changed a maximum of n times, 0×3 indicating exit to an idle mode, and 0×4 to 0×7 indicating reserved values.

The following Table 10 illustrates an example of a paging information field format of Table 8.

TABLE 10

| Parameter Name | Length | Value | Scope |
|---|---|---|---|
| Paging Information | | 1. PAGING_CYCLE - cycle at which paging message is transmitted within paging group.<br>2. PAGING_CYCLE_INDEX - determines cycle at which paging message is transmitted.<br>3. LARGE_PAGING_GROUP_OFFSET - determines frame within cycle at which paging message is transmitted. Must be smaller than PAGING_CYCLE value.<br>4. SMALL_PAGING_GROUP_OFFSET - determines frame within cycle at which paging message is transmitted. Must be smaller than PAGING_CYCLE value.<br>5. Large Paging group ID - ID of large paging group to which MS is assigned.<br>6. Small Paging group ID - ID of small paging group to which MS is assigned.<br>7. Small Paging Group Change Count - Number of changes of small paging groups.<br>8. BS Change Count - Number of changes of BSs | RNG-RSP<br>DREG-CMD |

Referring to Table 10, the paging information field may include at least one of a paging cycle, a paging offset and paging group information. In this case, the paging group information is determined by the BS based on the MS mobility information. The paging group information is included at least one of an LPG ID and an SPG ID.

The paging cycle denotes a transmission cycle of a paging message transmitted within a paging group and the paging offset denotes an allocation frame in a cycle at which the paging message is transmitted. The LPG ID indicates an ID of an LPG assigned to the MS and the SPG ID indicates an ID of an SPG assigned to the MS.

In FIG. 12, if the MS determines change of the paging group, the MS and BS perform location update, thereby changing the paging group assigned to the MS.

Figure 13:
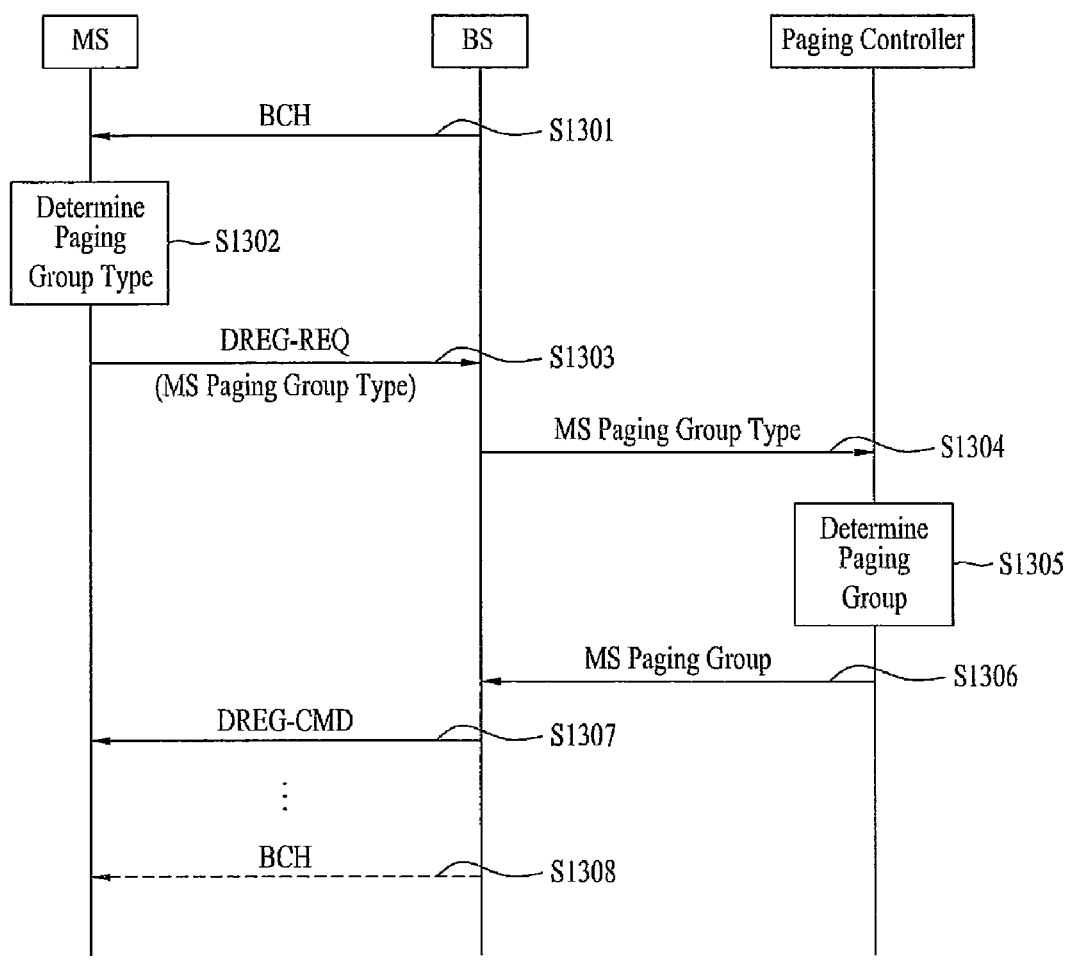
FIG. 13 illustrates a method for an MS to determine a paging group according to another exemplary embodiment of the present invention.

FIG. 13 illustrates a process for an MS to determine a paging group according to another exemplary embodiment of the present invention.

Referring to FIG. 13, a BS may transmit a BCH to an MS. The BS may transmit, through the BCH to the MS, at least one of an MS speed threshold parameter, a maximum handover count parameter, a call or packet arrival rate threshold parameter, and a maximum preferred BS count parameter. The BCH may be periodically transmitted or transmitted to the MS whenever an event occurs (step S1301).

The following Table 11 shows a part of BCH formats which may be used in step S1301.

TABLE 11

| Syntax | Size | Notes |
|---|---|---|
| Broadcast channel{ | | |
| ... | | |
| MS Speed Threshold | — | MS Speed threshold for determination about paging group type of MS |
| MAX Preferred BS Count | — | |
| MAX Handover Count | — | |
| Call or Packet Arrival Rate Threshold | — | |
| ... | | |
| } | | |

Referring to Table 11, the MS speed threshold field indicates a threshold value for determining a paging group type based on MS speed. The BS may transmit, through the BCH to the MS, at least one of the MS speed threshold parameter, maximum preferred BS count, maximum handover count, and call or packet arrival threshold parameter.

The MS may determine a paging group type using at least one of the count value and threshold value. Referring to FIG. 13, the MS may decode the BCH transmitted from the BS and determine the paging group type using the parameters of Table 11 upon entering an idle mode (step S1302).

Hereinafter, a method for determining the paging group type of the MS which may be used in step S1302 will be described.

First, the MS may determine a paging group upon entering the idle mode by comparing an MS speed in a normal mode with an MS speed threshold value (refer to Table 1 and Table 11). The MS speed threshold value may be used even after the MS enters the idle mode.

For example, if the MS receives the MS speed threshold value through the BCH in the idle mode, the MS may determine whether to change the paging group type (LPG or SPG)

or to maintain the existing paging group type, based on the MS speed. The MS speed threshold value may be measured in Km/hour.

Second, the MS may determine the paging group using the maximum handover count value. The maximum handover count value may be transmitted to the MS through the BCH. The MS may determine the paging group thereof upon entering the idle mode by comparing the number of handovers performed therein in a normal mode with the maximum handover count value.

Third, the MS may determine the paging group type by comparing a call arrival rate measured through a call or packet received in the normal mode with the call or packet arrival rate threshold value of Table 11, transmitted through the BCH.

Fourth, the MS may determine the paging group type using the maximum preferred BS count received through the BCH. The preferred BS parameter denotes a most preferred neighboring cell as a destination cell by a normal-mode MS which is traveling from a serving cell to another cell. The MS may determine the paging group type by comparing a preferred BS count in the normal mode with the maximum preferred BS count.

The MS may transmit the paging group type parameter determined in step S1302 to the serving BS through an MOB_DREG-REQ message (refer to Table 1) (step S1303).

The serving BS may transmit the paging group type parameter determined by the MS to a paging controller (step S1304).

The paging controller (PC) may determine the paging group of the MS with reference to the paging group type parameter determined by the MS. If it is judged that the paging group type demanded by the MS is not proper to a current communication environment, the paging controller may arbitrarily determine an optimal paging group even though the MS has transmitted the paging group type (step S1305).

The paging controller may transmit the paging group type which is to be assigned to the MS to the serving BS (step S1306). The serving BS may transmit an MOB_DREG-CMD message including paging group type information to the MS (step S1307).

Through such processes, the MS may determine the paging group type thereof before entering the idle mode and may receive an assigned optimal paging group upon entering the idle mode.

The BS may transmit a BCH including parameters shown in Table 11 to the MS every periodic or specific time. The BCH may refer to FIG. 9 (step S1308).

Even after entering the idle mode, the MS may maintain or change the paging group type, using the parameters transmitted thereto in step S1308. For example, an MS, a current paging group of which is an SPG, may perform a location update process for requesting a change of the paging group from the SPG to the LPG, when the MS speed is above a threshold (received through a DREG-CMD or BCH). If the MS speed is less than the threshold (e.g. received through DREG-CMD), the MS may maintain the previous paging group.

The constructions and steps of the above-described embodiments may be combined with each other. Further, the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. Claims that do not explicitly cite each other in the appended claims may be combined to configure an embodiment of the present invention or be included as a new claim by subsequent amendment after the application is filed.

The embodiments of the present invention can be applied to various wireless access systems. Examples of various wireless access systems include 3GPP (3rd Generation Partnership Project), 3GPP2, and/or IEEE 802.xx (Institute of Electrical and Electronic Engineers 802). The embodiments of the present invention can be applied to all technical fields to which the various access systems are applied, as well as the various access systems.

What is claimed is:

1. A method for performing a location update of a mobile station in an idle mode, the method comprising:
 transmitting, by the mobile station to a base station, a ranging request (RNG-REQ) message including mobility information to perform the location update wherein the mobility information represent a mobility of the mobile station; and
 receiving, by the mobile station, a ranging response (RNG-RSP) message including paging group information related with a new paging group from the base station,
 wherein the new paging group is assigned based on the mobility information, and
 wherein the mobility indicates a speed of the mobile station as one of slow, medium, or fast.

2. The method according to claim 1, further comprising:
 transmitting a deregistration request (DREG-REQ) message to initiate the idle mode, to the base station; and
 receiving a deregistration command (DREG-CMD) message allowing the initiation of the idle mode
 wherein the DREG-REQ message comprises mobility information representing a mobility of the mobile station, which is in normal mode.

3. The method according to claim 1, wherein the mobile station is assigned to one or more paging groups, and
 wherein one of the one or more paging groups is a primary paging group and a remainder of the one or more paging groups are secondary paging groups.

4. The method according to claim 3, wherein the primary paging group is a small paging group and at least one of the secondary paging groups is a large paging group.

5. The method according to claim 3, wherein a size of the primary paging group and a size of at least one of the secondary paging groups are different from each other.

6. The method according to claim 3, wherein the base station belongs to at least one of the one or more paging groups.

7. A method for supporting a location update of a mobile station in an idle mode, the method comprising:
 receiving, by a base station from the mobile station, a ranging request (RNG-REQ) message for performing the location update wherein the RNG-REQ message comprises mobility information representing a mobility of the mobile station;
 transmitting a ranging response (RNG-RSP) message including paging group information related with a new paging group to the mobile station,
 wherein the new paging group is assigned by the base station based on the mobility information, and
 wherein the mobility indicates a speed of the mobile station as one of slow, medium, or fast.

8. The method according to claim 7, further comprising:
receiving a deregistration request (DREG-REQ) message to initiate the idle mode, from the mobile station; and
transmitting a deregistration command (DREG-CMD) message allowing an initiation of the idle mode, to the mobile station,
wherein the DREG-REQ message comprises mobility information representing a mobility of the mobile station which is in normal mode.

9. The method according to claim 7, wherein the mobile station is assigned to one or more paging groups, and
wherein one of the one or more paging groups is a primary paging group and a remainder of the one or more paging groups are secondary paging groups.

10. The method according to claim 9, wherein the primary paging group is a small paging group and at least one of the secondary paging groups is a large paging group.

11. The method according to claim 9, wherein a size of the primary paging group and a size of at least one of the secondary paging groups are different from each other.

12. The method according to claim 9, wherein the base station belongs to at least one of the one or more paging groups.

13. A mobile station for performing a location update in an idle mode, the mobile station comprising:
a transmitter configured to transmit a message; and
a receiver configured to receive a message,
wherein the mobile station is configured to:
transmit a ranging request (RNG-REQ) message including mobility information to a base station via the transmitter, wherein the mobility information represent a mobility of the mobile station; and
receive a ranging response (RNG-RSP) message including paging group information related with a new paging group from the base station via the receiver,
wherein the new paging group is assigned based on the mobility information, and
wherein the mobility indicates a speed of the mobile station as one of slow, medium, or fast.

14. A base station for supporting a location update of a mobile station in an idle mode, the base station comprising:
a transmitter configured to transmit a message; and
a receiver configured to receive a message,
wherein the base station is configured to:
receive a ranging request (RNG-REQ) message including mobility information from the mobile station via the receiver, wherein the mobility information represent a mobility of the mobile station; and
transmit a ranging response (RNG-RSP) message including paging group information related with a new paging group to the mobile station via the transmitter,
wherein the new paging group is assigned based on the mobility information, and
wherein the mobility indicates a speed of the mobile station as one of slow, medium, or fast.

15. The mobile station according to claim 13, which is further configured to:
transmit a deregistration request (DREG-REQ) message to initiate the idle mode to the base station via the transmitter; and
receive a deregistration command (DREG-CMD) message allowing an initiation of the idle mode via the receiver,
wherein the DREG-REQ message comprises mobility information representing a mobility of the mobile station, which is in normal mode.

16. The mobile station according to claim 15, wherein the mobile station is assigned to one or more paging groups, and
wherein one of the one or more paging groups is a primary paging group and a remainder of the one or more paging groups are secondary paging groups.

17. The base station according to claim 14, wherein the base station is further configured to:
receive a deregistration request (DREG-REQ) message to initiate the idle mode to the base station via the receiver; and
transmit a deregistration command (DREG-CMD) message allowing an initiation of the idle mode via the transmitter,
wherein the DREG-REQ message comprises mobility information representing a mobility of the mobile station, which is in normal mode.

18. The base station according to claim 17, wherein the mobile station is assigned to one or more paging groups, and
wherein one of the one or more paging groups is a primary paging group and the remainder of the one or more paging groups are secondary paging groups.

* * * * *